Dec. 19, 1933.                S. SCHNELL                 1,940,022
                            BRAKING APPARATUS
                         Filed Sept. 17, 1931

Inventor
S. SCHNELL
By
Att'y.

Patented Dec. 19, 1933

1,940,022

UNITED STATES PATENT OFFICE 1,940,022

BRAKING APPARATUS

Steve Schnell, St. Louis, Mo., assignor to Wagner Electric Corporation, St. Louis, Mo., a corporation of Delaware Application September 17, 1931
Serial No. 563,255

3 Claims. (Cl. 188—106)

My invention relates to braking apparatus and especially to means to be associated with hydraulic braking apparatus whereby the brake friction elements may be "mechanically" actuated to serve as parking or "emergency" brakes.

It has been found very difficult in the past to incorporate auxiliary "mechanical" brake actuating mechanism within the drum of existing hydraulically actuated brakes due to the limited amount of space available between the wheel cylinder and the central depression in the backing plate for the drum. It is, therefore, one of the principal objects of my invention to provide a compact and efficient mechanical brake actuating means which may be incorporated in braking mechanism provided with hydraulic actuating means for normal operation.

Another object of my invention is to incorporate into the existing types of hydraulically actuated brake mechanism, a shoe actuating means of the floating lever type which will produce equal pressure on the brake shoes.

Figure 1:
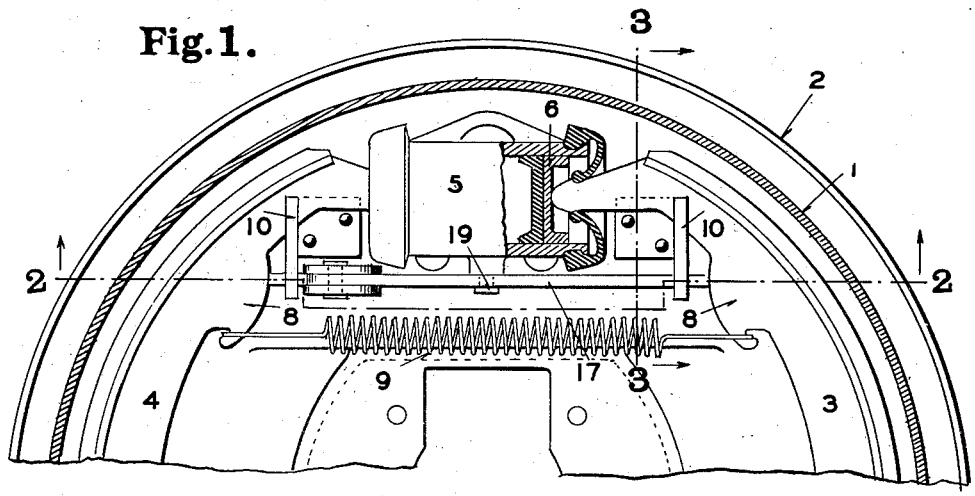
Figure 2:
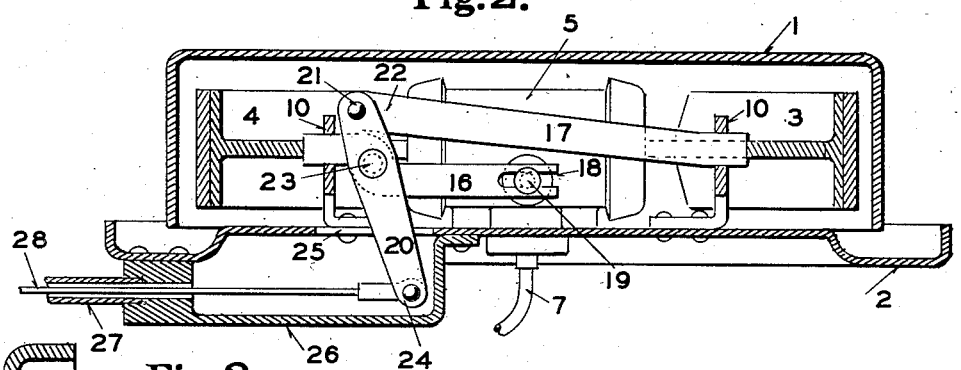
Figure 3:
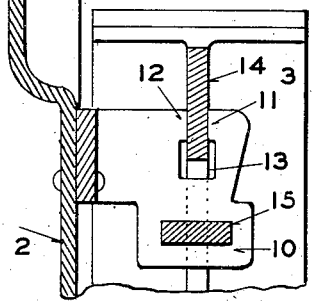

Other objects will become apparent from the description of my invetion taken in connection with the accompanying drawing in which Figure 1 is a side view, partly in section, of a hydraulic brake disclosing how my auxiliary brake mechanism is incorporated therein; Figure 2 is a cross sectional view on the line 2—2 of Figure 1; and Figure 3 is a cross sectional view on the line 3—3 of Figure 1, showing one of the guiding and supporting brackets.

Referring to the drawing in detail, 1 indicates a brake drum which is suitably secured to the wheel of a motor vehicle and is enclosed at its open side by a backing plate 2 provided with a central depression adapted to be fixed to an adjacent rigid part of the vehicle in a well known manner. Cooperating with the brake drum is an expansible brake having a pair of free ends 3 and 4. The brake may be either of the two-shoe pivoted type or of the single-band type, since the shoe design forms no part of my invention. A wheel cylinder 5 is secured to the backing plate between the brake ends 3 and 4 and contains therein the usual pistons 6 (only one of which is shown) in operative engagement with the free ends of the brake. A conduit 7 connects the cylinder to a source of pressure, controlled by the usual brake pedal, whereby the pistons may be actuated. Each free end of the brake is provided with a hooked portion 8 to which is attached one end of a spring 9 normally holding the brake shoes disengaged from the drum.

A pair of brackets 10 are secured to the backing plate and extend into the drum adjacent and above the hooked portion 8 of the brake shoes. Each of these brackets is provided with a pair of ears 11 and 12, forming a groove 13 into which the web portion 14 of the brake shoe extends, thereby preventing the shoe moving laterally or tilting. Each bracket 10 is also provided with an opening 15 just below the groove 13 to form a support and guide for the slidable members 16 and 17 of the auxiliary brake actuating mechanism. These two slidable members lie adjacent each other in the same horizontal plane and in the space between the wheel cylinder 5 and the spring 9. It is also to be noted that the members are confined within the outlines of the drum, thereby requiring no change in the construction of the backing plate. The end of the slidable member 16 remote from its bracket, is provided with an elongated slot 18 adapted to have sliding engagement with a stud 19 secured to the wheel cylinder. A short lever 20 has one of its ends pivotally connected at 21 with the free end 22 of the slidable member 17 and at an intermediate point 23 with the slidable member 16. The other end 24 of the lever 20 extends through on opening 25 in the backing plate. Since the lever 20 is pivoted only to the slidable members 16 and 17 and not to any fixed part, it is readily seen that as the end 24 is moved to the left in Figure 2, an equal force will be transmitted to each end 3 and 4 of the brake. By varying the distance between the pivot points 21 and 23 and the end 24 of the lever 20, the force transmitted to the slidable members 16 and 17 for a given force applied to the end 24 of the lever 20, can be varied as desired.

A casing member 26 is fixed to the outer side of the backing plate by suitable screws and surrounds the end 24 of the lever 20 and the opening 25. Attached to the casing member is a conduit 27 in which is slidable a cable 28, one end of which extends into the casing and is attached to the end 24 of the lever 20, and the other end of which is attached to an operating lever and cooperating ratchet (not shown) adjacent the operator's seat of the vehicle.

Having fully described my invention, what I claim as new and desire to secure by Letters Patent of the United States is:

1. In a braking apparatus, the combination of a brake drum, a backing plate therefor provided with an opening, an expansible brake having adjacent free ends, means for actuating said brake comprising a pair of adjacent slidable members each of which is adapted to engage one of the free ends of the brake, a floating lever pivotally connected at different points to each slidable member, one end of said lever extending through the opening in said backing plate, a casing surrounding the end of the lever and fixed to said backing plate adjacent the opening therein, and means extending into said casing for actuating the lever.

2. In a braking apparatus, the combination of a drum, a backing plate therefor, an expansible brake having adjacent free ends and means engageable with the free ends of said brake for expanding it into engagement with the drum, said means comprising a slidable member abutting one of the free ends of the brake, a guide and a support for one end of the slidable member, a second slidable member adjacent the first member and engageable with the other free end of the brake, a guide and a support for each end of the second slidable member, and a floating lever pivotally connected at its end to the first slidable member and at an intermediate point thereof to the intermediate portion of the second slidable member.

3. In a braking apparatus, the combination of a drum, a backing plate therefor, an expansible friction device having adjacent free ends, means engageable with the free ends of the friction device for expanding it into engagement with the drum, a spring cooperating with the free ends of the friction device below the expanding means for retracting the friction device from the drum and auxiliary applying means for the friction device lying between the expanding means and the spring, said auxiliary means comprising a pair of slidable members each of which is adapted to abut one of the free ends of the friction device but is unsecured thereto, a floating actuating lever pivotally connected to each slidable member and operable in a plane at right angles to the plane of the brake, and guiding and supporting means for each slidable member adjacent the end which abuts the friction device.

STEVE SCHNELL.